United States Patent
Spurgeon et al.

(10) Patent No.: US 9,770,681 B2
(45) Date of Patent: Sep. 26, 2017

(54) INTEGRATED MUFFLER FOR HYDROVAC SYSTEM

(71) Applicant: Southwest Rockies Manufacturing, LLC, Cortez, CO (US)

(72) Inventors: Clayton G. Spurgeon, Aztec, NM (US); Clinton L. Spurgeon, Magdalena, MN (US); Steven C. Spurgeon, Yellow Jacket, CO (US)

(73) Assignee: Southwest Rockies Manufacturing, LLC, Cortez, CO (US)

( * ) Notice: Subject to any disclaimer, the term of this patent is extended or adjusted under 35 U.S.C. 154(b) by 0 days.

(21) Appl. No.: 14/950,259

(22) Filed: Nov. 24, 2015

(65) Prior Publication Data
US 2016/0145820 A1    May 26, 2016

Related U.S. Application Data

(60) Provisional application No. 62/084,922, filed on Nov. 26, 2014.

(51) Int. Cl.
| | | |
|---|---|---|
| A47L 5/00 | (2006.01) | |
| A47L 7/00 | (2006.01) | |
| B01D 46/00 | (2006.01) | |
| B01D 35/147 | (2006.01) | |
| E01H 1/08 | (2006.01) | |
| E01H 1/10 | (2006.01) | |
| E02F 7/06 | (2006.01) | |
| A47L 9/00 | (2006.01) | |
| A47L 11/40 | (2006.01) | |
| E02F 3/88 | (2006.01) | |
| E03F 9/00 | (2006.01) | |

(52) U.S. Cl.
CPC .......... *B01D 35/147* (2013.01); *A47L 9/0081* (2013.01); *A47L 11/4097* (2013.01); *B01D 46/0087* (2013.01); *E01H 1/0827* (2013.01); *E01H 1/103* (2013.01); *E02F 3/8825* (2013.01); *E02F 7/06* (2013.01); *E03F 9/002* (2013.01)

(58) Field of Classification Search
CPC . A47L 9/0081; A47L 11/4097; B01D 35/147; B01D 46/0087; E01H 1/103
USPC ............. 15/326, 413, 320; 55/309–311, 313, 55/318–320
See application file for complete search history.

(56) References Cited

U.S. PATENT DOCUMENTS

| | | | |
|---|---|---|---|
| 2,879,861 A | | 3/1959 | Belsky et al. |
| 3,431,583 A | | 3/1969 | Daneman |
| 3,720,977 A | * | 3/1973 | Brycki ................ A47L 11/4044 15/321 |
| 4,475,264 A | | 10/1984 | Schulz |
| 4,724,573 A | * | 2/1988 | Ostergaard .............. A47L 11/30 15/321 |
| 4,938,309 A | * | 7/1990 | Emdy ................... F01N 13/002 15/314 |
| 5,180,407 A | | 1/1993 | DeMarco |
| 5,400,463 A | * | 3/1995 | Attard ................... A47L 9/0081 15/314 |
| 5,840,102 A | | 11/1998 | McCracken |
| 6,887,290 B2 | | 5/2005 | Strauser et al. |
| 2005/0274094 A1 | | 12/2005 | DeMarco |

(Continued)

*Primary Examiner* — Bryan R Muller (57) ABSTRACT

An integrated tank has a debris-storage chamber, a water-storage chamber, and a muffler system. The muffler system is disposed proximate the water-storage chamber. The muffler system includes a bypass muffler and a discharge muffler.

13 Claims, 6 Drawing Sheets

(56) References Cited

U.S. PATENT DOCUMENTS

| | | |
|---|---|---|
| 2007/0095370 A1 | 5/2007 | Kratser |
| 2011/0036635 A1 | 2/2011 | Rajewski |
| 2014/0082880 A1 | 3/2014 | Roden |
| 2015/0230675 A1* | 8/2015 | Van Den Bosch ... A47L 9/0081 15/326 |

* cited by examiner

INTEGRATED MUFFLER FOR HYDROVAC SYSTEM

CROSS-REFERENCE TO RELATED APPLICATIONS

This application claims priority to and the benefit of U.S. Provisional Patent Application No. 62/084,922, filed Nov. 26, 2014, entitled INTEGRATED MUFFLER FOR HYDROVAC SYSTEM, the disclosure of which is incorporated hereby by reference herein in its entirety.

BACKGROUND

Hydrovac machines are (often) truck-mounted systems that spray water onto dirt at high pressure and utilize a high-strength vacuum system to lift the resulting water and dirt (i.e., mud) mixture. These systems are used for excavation, cleaning (of storm sewers and the like), and other purposes. A single tank disposed on the back of a truck includes a water-storage section and a debris-storage section. The system includes a blower that draws the mud into the debris section, where it is separated from the suction air. The suction air, now substantially free of debris, is filtered and drawn through the blower (which, again, creates the suction). Discharge air from the blower is passed through a muffler to reduce the sound at the muffler discharge outlet. Additionally, a bypass system is utilized to prevent the blower from dead-heading as it draws mud and debris during operation. The bypass system draws air from ambient, via a bypass muffler system, and into the blower inlet. This allows the blower to operate efficiently and reduces the risk of blower damage, as volumes of heavy mud and other debris are sucked up. In existing systems, the discharge and bypass mufflers are discrete insulated pipes into which high-velocity air is discharged or drawn through, respectively. They are typically disposed proximate the tank, above or below the blower.

SUMMARY

In one aspect, the technology relates to an integrated tank having: a debris-storage chamber; a water-storage chamber; and a muffler system disposed proximate the water-storage chamber, wherein the muffler system includes: a bypass muffler; and a discharge muffler. In an embodiment, the water-storage chamber includes a water-storage chamber outer perimeter and wherein the muffler system has a muffler system outer perimeter substantially coextensive with the water-storage chamber outer perimeter. In another embodiment, the muffler system is substantially cylindrical. In yet another embodiment, a first sector of the muffler system defines the discharge muffler and a second sector of the muffler system defines the bypass muffler. In still another embodiment, both the bypass muffler and the discharge muffler each include a plurality of chambers.

In another embodiment of the above aspect, each of the plurality of chambers is separated by a baffle plate. In an embodiment, each of the baffle plates defines a plurality of openings and includes a plurality of vanes. In another embodiment, each of the bypass muffler and the discharge muffler includes an inlet in fluidic communication with a first chamber of the plurality of chambers and an outlet in fluidic communication with a second chamber of the plurality of chambers.

In another aspect, the technology relates to a muffler system for an industrial vacuum, the muffler system having: an outer housing at least partially defining a substantially cylindrical volume having a substantially circular cross section; a discharge muffler defined by a first sector of the substantially circular cross section; and a bypass muffler defined by a second sector of the substantially circular cross section. In an embodiment, the discharge muffler has a plurality of chambers separated by a plurality of baffles. In another embodiment, each of the plurality of baffles defines a plurality of openings and includes a plurality of vanes. In yet another embodiment, each of the plurality of chambers is defined by a subsector of the first sector. In still another embodiment, the discharge muffler further includes a discharge inlet into a first chamber of the plurality of chambers and a discharge outlet from a second chamber of the plurality of chambers.

In another embodiment of the above aspect, the discharge muffler further includes a third chamber of the plurality of chambers disposed between the first chamber of the plurality of chambers and the second chamber of the plurality of chambers. In an embodiment, the discharge muffler further includes a guide plate disposed in the first chamber of the plurality of chambers. In another embodiment, the discharge muffler includes a condensate drain. In yet another embodiment, the bypass muffler includes a plurality of chambers separated by a baffle defining a plurality of openings and having a plurality of vanes. In still another embodiment, the bypass muffler further includes a bypass inlet into a first chamber of the plurality of chambers and a bypass outlet from a second chamber of the plurality of chambers.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
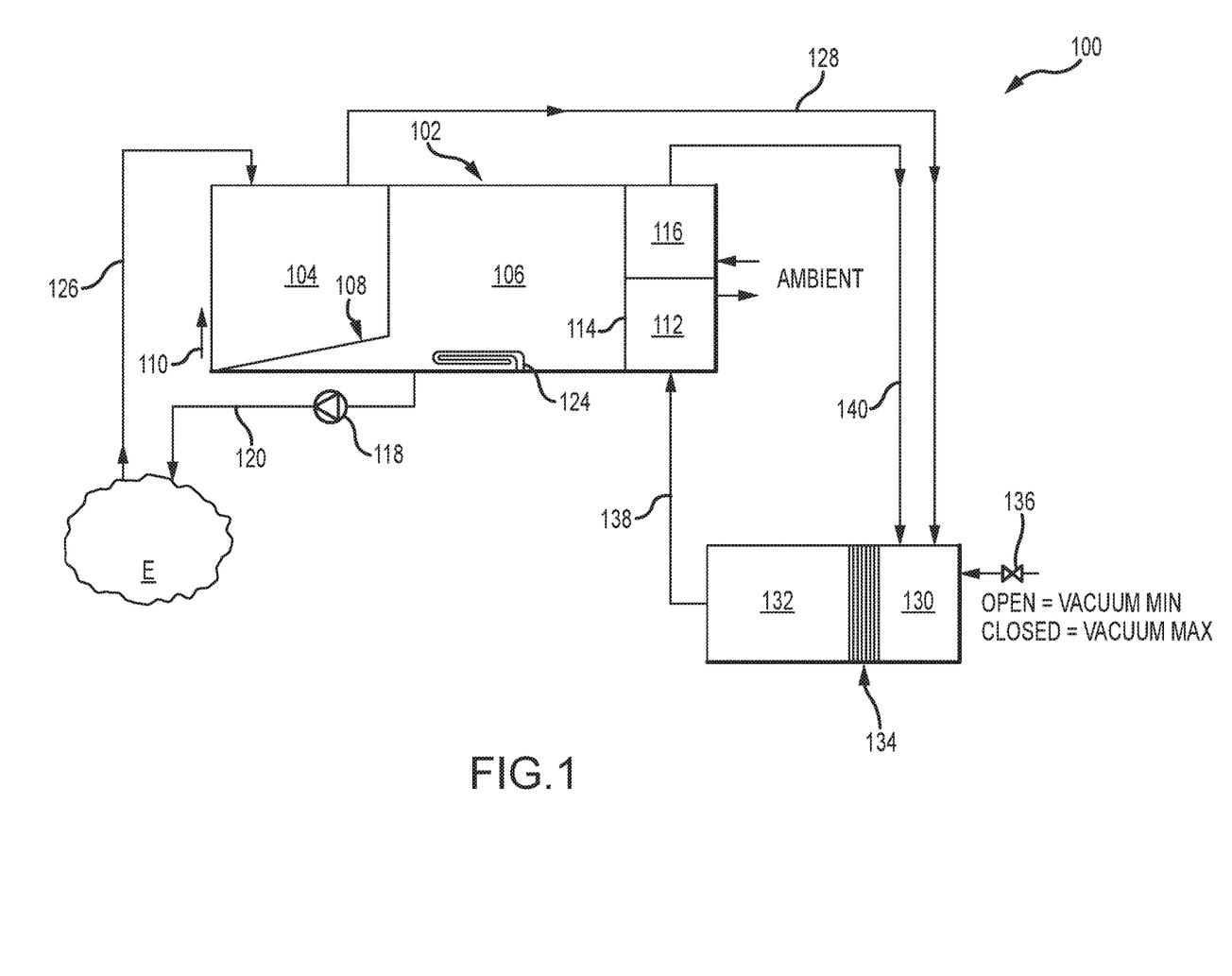
FIG. 1 is a schematic view of a hydrovac system.

FIG. 1 is a schematic view of an industrial hydrovac system 100. The hydrovac system 100 includes an integrated tank 102 that can be installed on the back of a commercial vehicle, such as a truck (not shown). Although vehicle-mounted hydrovac systems are more versatile, stationary systems are also contemplated for certain applications. The integrated tank 102 includes a plurality of sections. A debris-storage section, chamber, or tank 104 includes a cyclone or other structure to separate debris from suction air. A water-storage section, chamber, or tank 106 holds the water utilized in excavation processes. In certain embodiments, the water-storage section 106 may extend below the debris-storage section 104, so as to provide a pitched floor 108 in the debris-storage section 104 which may aid in draining the debris-storage section 104. The pitched floor 108 pitches towards a gate 110 or other drain that can be opened as required to drain the debris-storage section 104. A discharge muffler 112 is disposed proximate the water-storage section 106, and separated therefrom by a wall 114. The wall 114 may be manufactured of steel, which is similar in structure and thickness to the other walls that form the integrated tank 102. Steel having a thickness of about 0.25 inches is contemplated for certain applications, although other materials and thicknesses are contemplated. In one embodiment, ASME SA 516 Grade 70 Carbon Steel may be utilized. A bypass muffler 116 is disposed proximate the discharge muffler 112 and water-storage section 106. The integrated tank 102 is configured as described further herein, so as to appear visually as a single tank. This may be achieved by welding or otherwise securing the discharge muffler 112 and the bypass muffler 116 to an existing water and debris tank for a retrofit configuration, or an integrated tank 102 may be custom fabricated for particular applications.

During use, water is pumped via a water pump 118 through a water line 120 so as to be directed at an excavation site E. The water contained in the water-storage section 106 may be heated via a heat exchanger 122. The heat exchanger 122 may utilize an electric element or a fluid heat transfer element. In the latter case, the heat exchanger 122 may be connected to the coolant system of the vehicle. Use of a heat exchanger 122 may be desirable in environments where the hydrovac system 100 is exposed to extremely low ambient temperatures. Additionally, the water stored in the water-storage section 106 may be further heated by a flow of discharge air through the discharge muffler 112, as described in more detail below. As the high-pressure water loosens the dirt, sand, and rocks (these and other elements are referred to herein generally as debris or mud), a vacuum hose 126 is utilized to suction the debris from the excavation site E. The debris is drawn through the vacuum hose 126 and into the debris-storage section 104, where a cyclone and/or other structure separates the debris from the suction air. The suction air is drawn via a suction main 128 into a filter plenum 130. The filter plenum 130 is disposed upstream of a blower 132 that generates suction pressure. A filter 134 is disposed in the plenum 130 and filters any residual debris that may still be present in the suction air. A control valve 136 is also connected to the plenum 130 and is used to control the amount of vacuum generated in the suction line 128 (and therefore, at the vacuum hose 126). The control valve 136 may be two-way or variable position, and may be controlled electronically or manually. When fully closed, a maximum vacuum pressure is formed in the plenum 130 by the blower 132 and the suction line 128, debris-storage section 104, and vacuum hose 126. When fully open, a minimum vacuum pressure is formed in those components (as air from ambient is drawn into the plenum 130 via the control valve 136. Control valve 136 positions between fully-open and fully-closed will generate a corresponding vacuum pressure in the suction line 128, debris-storage section 104, and vacuum hose 126.

Discharge air generated by the blower 132 is directed into a discharge line 138, then into the discharge muffler 112, as described in further detail below. Temperature of the air in the discharge line 138 is generally warmer than ambient, thus introducing some heat into the discharge muffler 112, proximate the water-storage section 106. This heat will transfer via the wall 114 so as to further warm the water contained therein, to reduce the likelihood of freezing. Beyond the discharge muffler 112, the discharge air is discharged into ambient. During suction operations, the vacuum hose 126 is prone to clogging by rocks, solid debris, or simply the sheer volume of mud drawn into the vacuum hose 126. This clogging happens intermittently and unpredictably during suction operations. To avoid deadheading of, and potential damage to, the blower 132, the system 100 includes a vacuum bypass system that draws air from ambient to satisfy the blower 132 when excessive negative pressure is generated on the suction side of the blower 132 generally in the plenum 130. During bypass airflow, air is drawn from ambient via the bypass muffler 116 into the bypass line 140 and into the plenum 130 to satisfy the blower 132.

Figure 2:
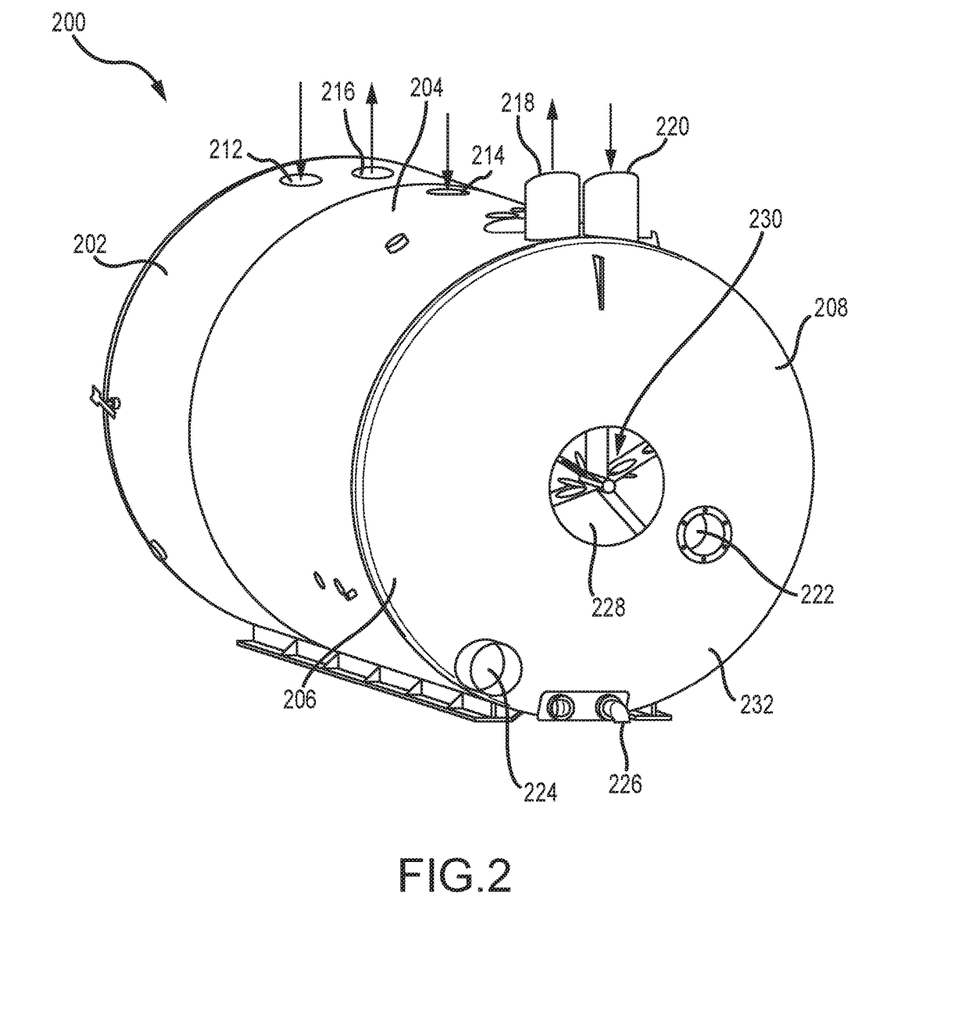
FIG. 2 is a front perspective view of an integrated tank system for a hydrovac system.

FIG. 2 is a front perspective view of an integrated tank system 200 for a hydrovac system. The tank system 200 includes a debris-storage section 202, a water-storage section 204, a discharge muffler 206, and a bypass muffler 208. As can be seen in FIG. 2, the integrated tank system 200 is configured so as to be disposed on a vehicle. A gate (not shown) is connected to the debris-storage section 202, and is oriented at a rear of the vehicle for easy access thereto. A debris tank inlet 212 is disposed at an upper portion of the debris-storage section 202 and a water inlet 214 is used to fill the water-storage section 204 with water prior to excavation operations. A debris tank suction air outlet 216 is connected to the inlet of a blower (not shown) as described above. A discharge air outlet 218 is disposed at an upper portion of the discharge muffler 206. By discharging air up and away from operators on the ground, sound levels generated by air flow through the hydrovac can be reduced. A bypass air inlet 220 is disposed at an upper portion of the bypass muffler 208. In addition to reducing noise levels, for reasons similar to the placement of the discharge air outlet 218, locating the bypass air inlet 220 further away from the ground helps prevent situations where objects located at ground level may be drawn into the bypass air inlet 220. A screen, mesh, or other perforated cover may help prevent such infiltration as well.

A bypass air outlet 222 connects to the bypass muffler 208 at a location remote from the bypass air inlet 220 and may be connected to a bypass line (not shown) such that bypass air can flow to a blower (not shown). A discharge air inlet 224 is connected to the discharge muffler 206 at a location remote from the discharge air outlet 218 and receives air discharged by the blower. The introduction of warm discharge air into the discharge muffler 206 can cause the accumulation of condensation therein. This condensation may be exacerbated by the proximity of the cooler water in the water-storage section 204, as well as potentially cooler ambient temperatures. Accordingly, the discharge muffler includes a condensate drain 226 that is disposed at a lower portion of the discharge muffler 206. The condensate drain 226 may be normally-open or normally-closed and may include a donut at the outlet. The donut is a heated portion of pipe that prevents freezing of the pipe. The donut may be heated via an electric element or via connection to the vehicle coolant circulation system. An end opening 228 is depicted in an end plate 232. The end opening 228 may be uncapped so as to allow access to the internal compartment 230 of the discharge muffler 206 and the bypass muffler 208 for cleaning purposes. This end opening 228 may be sealed or capped as required during suction operations.

Figure 3:
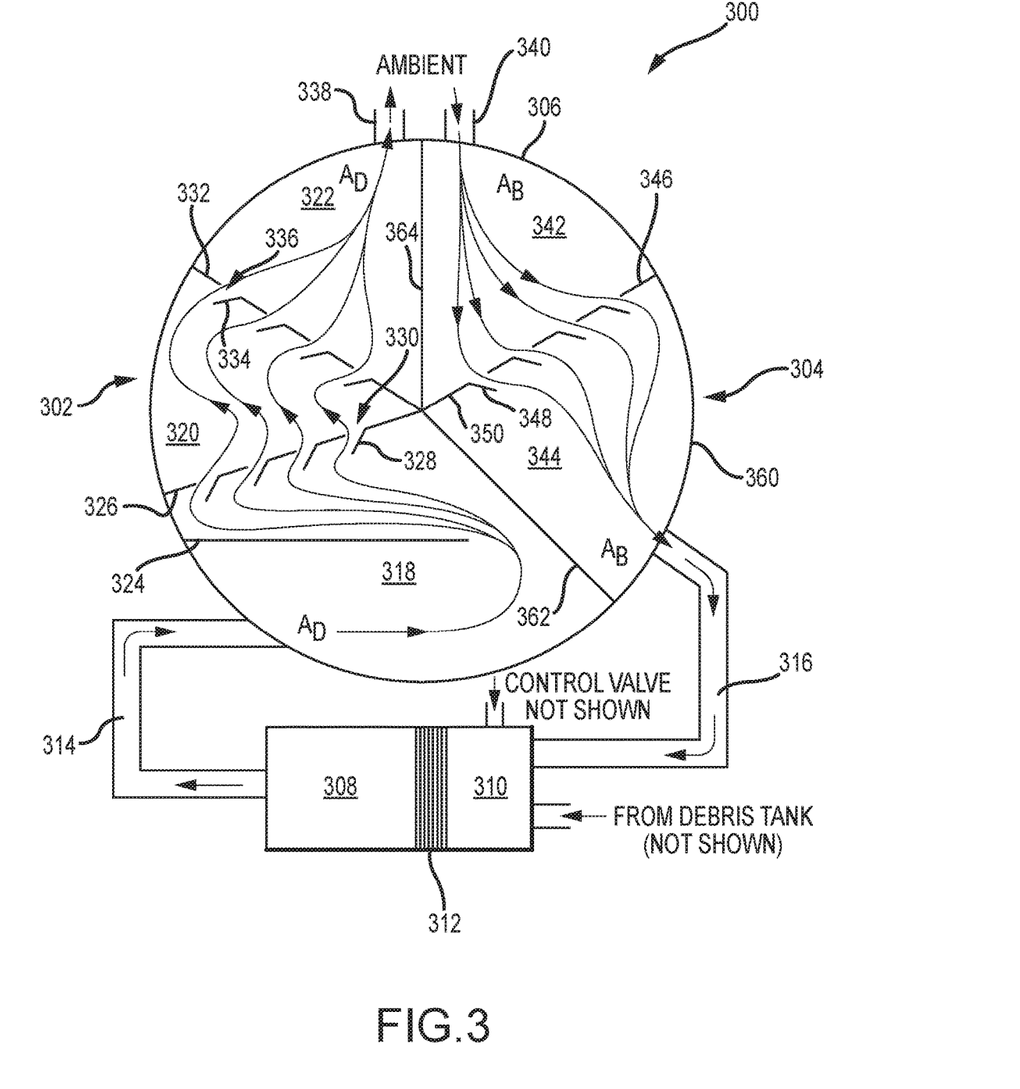
FIG. 3 is a rear section schematic view of a muffler system for an integrated tank system.

FIG. 3 is a rear section schematic view of a muffler system 300 for an integrated tank system. The proposed technology integrates a discharge muffler 302 and bypass muffler 304 into the single truck tank (depicted by outer perimeter wall 306). These elements are described in more detail below. Also depicted are a blower 308, a filter plenum 310, a filter 312, a discharge line 314, and a bypass line 316. A control valve and suction line are not shown. These elements are all described above with regard to FIG. 2 and are not necessarily described further.

Returning to the structure of the discharge muffler 302 and bypass muffler 304, each of these components may be configured as multi-chamber structures. In the depicted embodiment, the discharge muffler 302 includes three chambers 318, 320, 322. The first chamber 318 is fluidically connected to an inlet at the discharge line 314 and has a guide plate 324 disposed therein. The guide plate 324 directs a discharge airflow $A_D$ and increases the travel distance of the airflow. This increased travel distance of the discharge airflow $A_D$ helps reduce sound output from the blower 308. The discharge airflow $A_D$ flows around the guide plate 324 and encounters a first baffle plate 326. The first baffle plate 326 includes a number of vanes 328 disposed proximate a number of openings 330 in the baffle plate 326. The vanes 328 change the direction of the discharge airflow $A_D$, again decreasing sound output. The discharge airflow $A_D$ enters the second chamber 320 and flows towards a second baffle plate 332 having a plurality of vanes 334 disposed proximate a plurality of openings 336. Again, the vanes 328 on the second baffle plate 332 change the direction of the discharge airflow $A_D$, again decreasing sound output. Thereafter, the discharge airflow $A_D$ flows into the third chamber 322 and out a discharge air outlet 338. The discharge muffler 302 includes three chambers 318, 320, 322. In other embodiments, a discharge muffler can include fewer than or greater than three chambers. Additionally, baffle plates need not be utilized to separate adjacent chambers. Instead, discrete vanes may be installed directly within the discharge muffler to partially define a plurality of chambers. Utilizing baffle plates, however, allows for ease of manufacture and assembly.

Turning to the bypass muffler 304, bypass air $A_B$ is drawn into the bypass muffler 304 via a bypass air inlet 340 in fluidic communication therewith. The bypass muffler 304, in the depicted embodiment, includes two chambers 342, 344 separated by a baffle plate 346. The baffle plate 346 includes a plurality of vanes 348 disposed proximate a plurality of openings 350. Like the baffle plates 326, 332 in the discharge muffler 302, the vanes 348 change the direction of the bypass airflow $A_B$ to decrease sound output. The bypass airflow $A_B$ is drawn into the bypass line 316. In other embodiments, a bypass muffler can include fewer than or greater than two chambers in the bypass muffler 304. Additionally, baffle plates need not be utilized to separate adjacent chambers. Instead, discrete vanes may be installed directly within the bypass muffler to define a plurality of chambers. Utilizing baffle plates, however, allows for ease of manufacture and assembly. In certain embodiments, air may flow out of the bypass air inlet 340 at certain times during operation.

Further features may be incorporated into the muffler systems described herein so as to improve performance, decrease sound levels, etc. For example, in FIG. 3, the muffler system 300 includes an outer perimeter 360 that is substantially coextensive with an outer perimeter of the water-storage and debris-storage sections of an integrated tank. The outer perimeter 360 defines a substantially circular cross sectional area, as depicted in FIG. 3. An outer surface of the water-storage section forms a first end wall of the muffler system 300, while the end plate (FIG. 2, 232) forms a second end wall of the muffler system 300. Thus, although the first and second end walls are depicted as slightly curved, the muffler system 300 forms a substantially cylindrical volume. The various interior walls of the muffler system 300 may be covered with a sound insulation material, such as fiberglass muffler packing. The surfaces of this material may be reinforced with robust metal or plastic sheeting or mesh material so as to prevent damage thereto by fast flowing discharge or bypass airflows or debris contained therein. As can be seen in FIG. 3, the cross-sectional area of the muffler system 300 is divided by interior walls 362, 364 and baffle plates 326, 332, 346 into a number of sectors. In the depicted embodiment, the term "sector" can be defined mathematically, as a portion of a circle bounded by two radii and the arc subtended by them. In other embodiments, each sector need not be defined mathematically, and may be defined as a portion of the circle, bounded by chords or partial chords of the circle, the outer perimeter, or combinations thereof. In the depicted embodiment, the discharge muffler 302 is defined by three sectors, each of which define chambers 318, 320, 322, separated by baffle plates 326, 332. In that regard the sector defining the discharge muffler 302 has a plurality of sub-sectors, each defining one of the chambers 318, 320, 322. Similarly, the bypass muffler 304 is defined by two sectors, each of which define chambers 342, 344, separated by a baffle plates 346. In that regard the sector defining the bypass muffler 304 has a plurality of sub-sectors, each defining one of the chambers 342, 344.

The integrated muffler systems depicted and described herein provide a number of advantages over existing muffler systems for hydrovac systems. First, the integrated configuration eliminates the discrete mufflers typical in other systems, improving visual aesthetics of the vehicle on which the system is mounted. Second, elimination of the discrete mufflers can improve access to the blower, which is typically installed behind the cab of a vehicle. Third, the particular construction of the discharge and bypass mufflers increases travel distance for the discharge and bypass airflows (via the plurality of vaned baffle plates). Increased travel distance decreases sound at the discharge outlet and bypass inlet. Fourth, the discharge air from the blower is often warmer than ambient. The proximity of this warmer airflow to the water-storage tank helps prevent freezing of the water when the hydrovac is used in extremely cold environments. Additional advantages will be apparent to a person of skill in the art.

Figure 4:
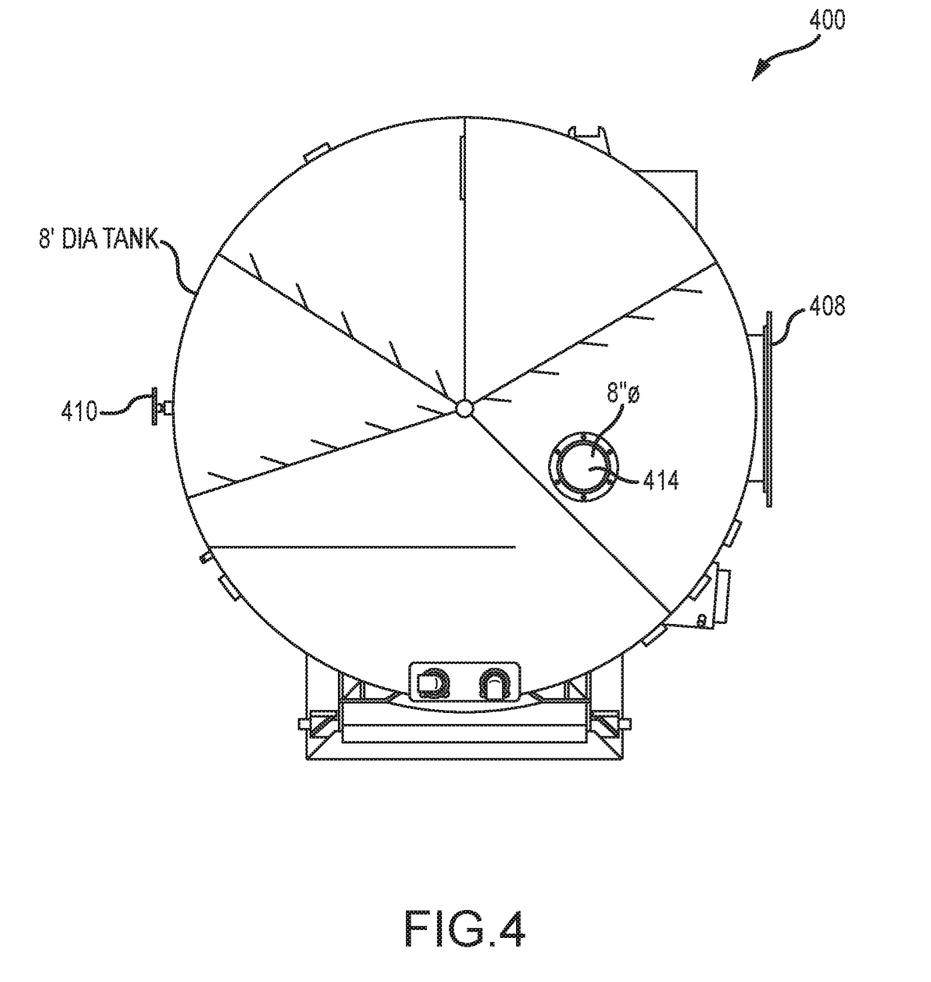
FIGS. 4 and 5 depict rear section and side section views, respectively, of a commercial embodiment of an integrated hydrovac tank manufactured in accordance with the disclosure herein.
Figure 5:
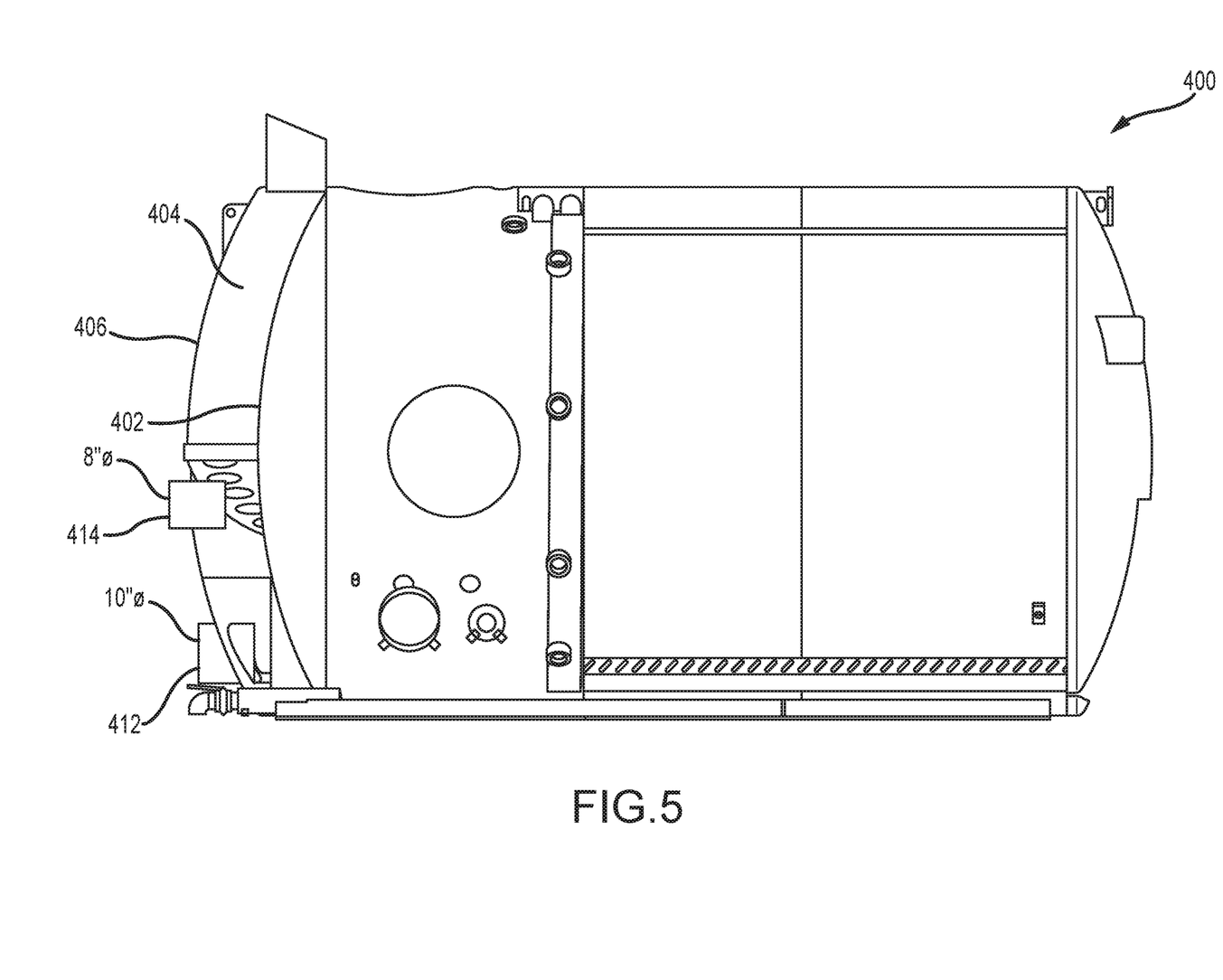

FIGS. 4 and 5 depict rear section and side section views, respectively, of a commercial embodiment of an integrated hydrovac tank 400 manufactured in accordance with the disclosures herein. FIGS. 4 and 5 are described simultaneously. The dimensions depicted thereon are merely an example of one particular commercial embodiment and are not to be considered limiting. In the depicted embodiment, the integrated tank 400 has a diameter of about 8 feet. A first end wall 402 of the muffler system 404 is defined by an 8 foot diameter dished head that forms an exterior wall of the water-storage section. A second end wall 406 is defined by an 8 foot diameter flanged and dished head. The height of the flange of the second end wall 406 is just over 12 inches, which produces an interior volume of over 50 cubic feet. In the depicted embodiment, the bypass muffler 408 occupies just over one-third of the cross-sectional area of the circle that defines the muffler system 400, with the discharge muffler 410 occupying the remaining two-thirds of that cross-sectional area. Thus, the interior volume of the bypass muffler 408 is about 20 cubic feet, while the interior volume of the discharge muffler 410 is about 33 cubic feet. In systems having a blower sized to about 3800 CFM at 28" Hg, the muffler volumes depicted herein are significantly greater than existing systems having discrete, tubular mufflers. This increase in volume helps reduce sound levels during operation of the hydrovac system. A discharge inlet 412 having a 10 inch diameter is also depicted, as is a bypass outlet 414 having an 8 inch diameter.

Figure 6:
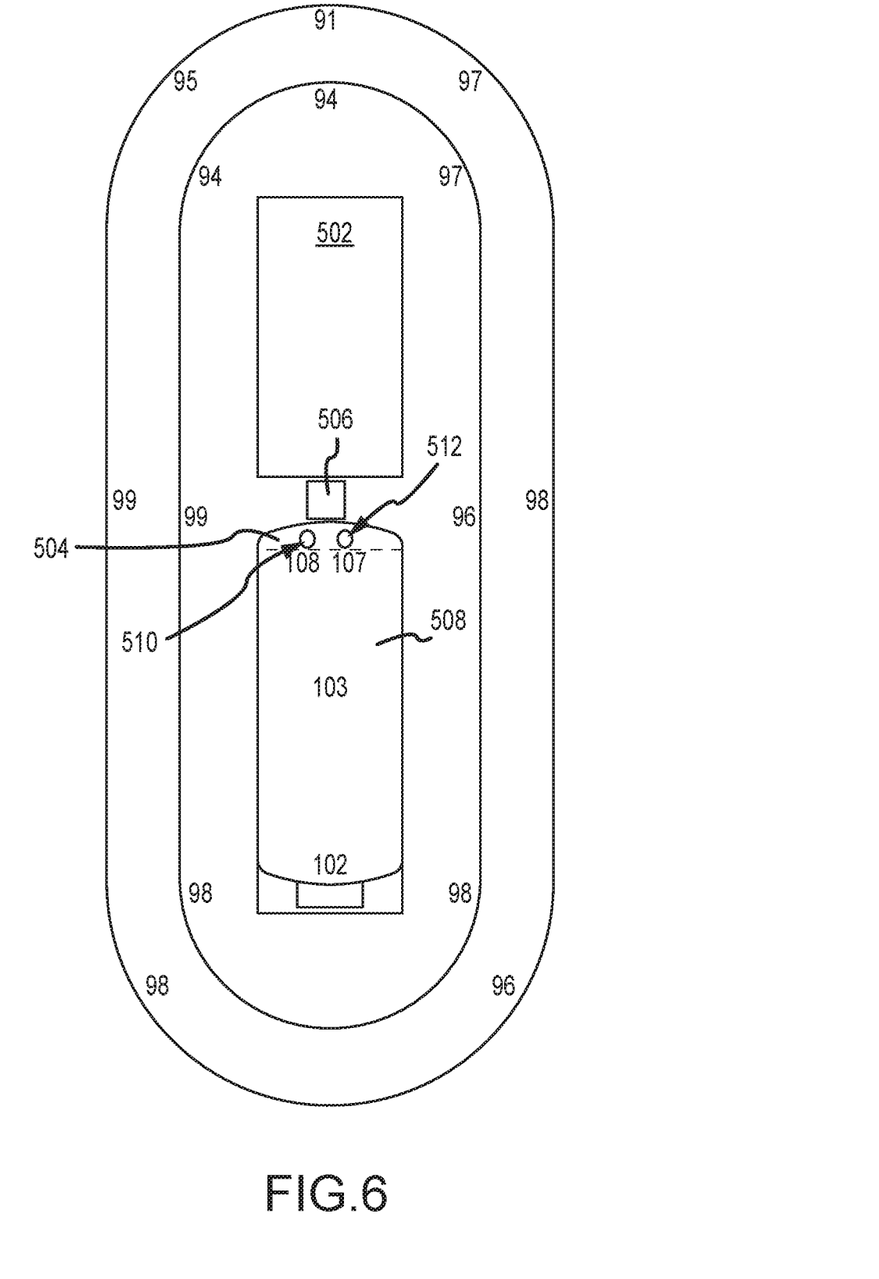
FIG. 6 depicts a top schematic view of decibel readings around an exemplary hydrovac system.

FIG. 6 depicts a top schematic view of decibel readings around an exemplary hydrovac system 500. The system 500 includes a vehicle 502 having a muffler system 504 and a blower 506. The muffler system 504 is integrated into a tank 508, as described elsewhere herein, and includes a bypass air inlet 510 and a discharge air outlet 512. The blower is a Robushi RB-DV 125, with a cfm rating of 3800 at 28" Hg, available from Gardner Denver S.r.I. —Divisione Robushci, of Parma, Italy. The decibel readings at various locations around the vehicle 502 and tank 508 are depicted. Notably, at the bypass air inlet 510, the decibel reading is about 108 dB. At the discharge air outlet 512, the decibel reading is about 107 dB. These readings are about 8-9 dB lower than a comparable (with regard to suction capacity) hydrovac system using a Roots-type blower and a standard insulated pipe muffler system currently used in hydrovac applications. Additionally, at various locations around the vehicle 502 and tank 508, the decibels readings are, on average about 4-6 decibels lower than the comparable Roots-type blower hydrovac system.

This disclosure described some embodiments of the present technology with reference to the accompanying drawings, in which only some of the possible embodiments were shown. Other aspects, however, can be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope of the present technology. Therefore, the specific structure, acts, or media are disclosed only as illustrative embodiments. The scope of the technology is defined by the following claims and any equivalents therein.

What is claimed is:

1. A tank system comprising:
an integrated tank comprising:
a debris-storage chamber:
a water-storage chamber; and
a substantially cylindrical muffler system disposed proximate the water-storage chamber, wherein the muffler system comprises:
a bypass muffler defined by a first sector;
and a discharge muffler defined by a second sector; and
a blower configured to discharge downstream air through the discharge muffler and to generate upstream suction pressure such that at least one of (i) vacuum pressure is induced in the debris-storage chamber and (ii) ambient air is drawn through the bypass muffler.

2. The tank system of claim 1, wherein the water-storage chamber comprises a water-storage chamber outer perimeter and wherein the muffler system comprises a muffler system outer perimeter substantially aligned with the water-storage chamber outer perimeter.

3. The tank system of claim 1, wherein both the bypass muffler and the discharge muffler each comprise a plurality of chambers.

4. The tank system of claim 3, wherein each of the plurality of chambers are separated by a baffle plate.

5. The tank system of claim 4, wherein each of the baffle plates define a plurality of openings and comprise a plurality of vanes.

6. The tank system of claim 3, wherein each of the bypass muffler and the discharge muffler comprise an inlet in fluidic communication with a first chamber of the plurality of chambers and an outlet in fluidic communication with a second chamber of the plurality of chambers.

7. The tank system of claim 3, wherein each of the plurality of chambers are defined by a subsector of the first sector.

8. The tank system of claim 3, wherein the discharge muffler further comprises a discharge inlet into a first chamber of the plurality of chambers and a discharge outlet from a second chamber of the plurality of chambers.

9. The tank system of claim 8, wherein the discharge muffler further comprises a third chamber of the plurality of chambers disposed between the first chamber of the plurality of chambers and the second chamber of the plurality of chambers.

10. The tank system of claim 8, wherein the discharge muffler further comprises a guide plate disposed in the first chamber of the plurality of chambers.

11. The tank system of claim 9, wherein the discharge muffler comprises a condensate drain.

12. The tank system of claim 9, wherein the bypass muffler comprises a plurality of chambers separated by a baffle defining a plurality of openings and comprising a plurality of vanes.

13. The tank system of claim 12, wherein the bypass muffler further comprises a bypass inlet into a first chamber of the plurality of chambers and a bypass outlet from a second chamber of the plurality of chambers.

* * * * *